3,012,978
PROCESS OF TREATING FILAMENTS WITH A PEROXYGEN COMPOUND
Jack Swerdloff, Ripplemead, Va., assignor to Celanese Corporation of America, New York, N.Y., a corporation of Delaware
No Drawing. Filed Oct. 26, 1954, Ser. No. 464,880
5 Claims. (Cl. 260—17)

This invention relates to textile materials and is particularly concerned with textile materials having an improved resistance to gas fading.

In the coloration of textile materials it is very desirable that the colors produced on the materials be as fast as possible to light, washing, and to other agencies such as acid fumes. Many dyestuffs yield on organic derivative of cellulose and polyester textile materials desirable colors which are fast to light and washing, but these colors often suffer from a lack of fastness to acid fumes. When textile materials to which these dyestuffs have been applied are exposed to acid fumes such as, for example, the products of combustion of coal, gas, etc., the color undergoes a change in shade, usually referred to as gas fading. The change which occurs may be a dulling of the brightness of the shade in some instances and in others there may be a definite change in color. These undesirable effects are frequently observed in the case of many anthraquinone dyestuffs which yield valuable blue colors on the organic derivative of cellulose and polyester textile materials. When such materials dyed with these dyestuffs are exposed to acid fumes, the colors change from a pure blue shade to one having a reddish cast. On continued exposure to the acid fumes, the blue color may even change to a pink color. Such changes obviously restrict the range of usefulness of these dyestuffs and the textile materials dyed therewith.

It has been previously proposed to improve the resistance of the organic derivative of cellulose and polyester textile materials to gas fading by incorporating therein an alkaline salt of a polymer containing free carboxyl groups. In carrying out the process, there is incorporated into the textile material a polymer containing carboxyl groups, anhydride groups, or a mixture of the two. On treating the said textile materials with water, the anhydride groups are hydrolyzed to carboxyl groups. Finally, the polymers are converted to their alkaline salts by treatment of the textile materials with an alkaline medium having a pH above about 7.5 or, preferably, between about 8 and 9.5. Such treatments may be effected during the normal wet processing of the textile materials as during their dyeing, soaping, or the like. The polymers that may be used, include, for example, the copolymers of an ethylenically unsaturated carboxylic acid and a vinyl compound. The ethylene carboxylic acid, which is preferably an ethylene $\alpha,\beta$-dicarboxylic acid, its half ester, or its anhydride, may, for example, be maleic acid, fumaric acid, maleic anhydride, the mono-methyl, mono-ethyl or mono-propyl esters of maleic acid, and the mono-methyl, mono-ethyl and mono-propyl esters of fumaric acid. There may also be used as the ethylenically unsaturated carboxylic acid, acrylic acid and methacrylic acid. The vinyl compounds employed in these polymers include, for example, styrene, vinyl acetate, vinyl chloride, acrylonitrile or alkyl vinyl ethers, such as, methyl vinyl ether, ethyl vinyl ether, propyl vinyl ether, butyl vinyl ether, isobutyl vinyl ether, pentyl vinyl ether and hexyl vinyl ether. Specific copolymers that may be employed are those obtainable from maleic anhydride and vinyl acetate, maleic anhydride and vinyl chloride, maleic anhydride and styrene, maleic anhydride and isobutyl vinyl ether, and the like. There may also be employed polymers obtained by a partial or complete hydrolysis of the ester groups of polymerized acrylic esters, polymerized methacrylic esters, or copolymers of acrylic esters or methacrylic esters with vinyl compounds.

While textile materials that have been treated in this manner show a much improved resistance to gas fading, it has been found that they exhibit a tendency, especially at elevated temperatures, to develop an undesirable coloration, usually of pinkish hue. This tendency is particularly marked when the spinning solution or melt from which the textile materials are prepared contains a certain proportion of textile material that has previously been spun and is being reprocessed. This reprocessed material has had applied thereto a lubricant and it is believed that the pink coloration develops as a result of a reaction that occurs between certain constituents of the lubricant, for example the amines, such as triethanolamine, present therein, and the polymer or certain impurities present therein.

It is an important object of this invention to provide a textile material which will be free from the foregoing and other disadvantages.

A further object of this invention is to provide a textile material containing an alkaline salt of a polymer having free carboxyl groups, which textile material will exhibit good resistance to gas fading and which will be free from any tendency to develop an undesirable coloration during its production or use.

Other objects of this invention will be apparent from the following detailed description and claims.

According to the present invention, the tendency for an undesirable coloration to develop in a textile material containing an alkaline salt of a polymer having free carboxyl groups during its production or use may be substantially eliminated by treating said textile material or the polymer that is to be incorporated therein, with an oxidizing agent. Not only does the treatment permanently eliminate the tendency for the development of an undesirable coloration, but, when the treatment is applied to the textile material, it improves the whiteness thereof which is, of course, advantageous. The treatment with an oxidizing agent does not itself alter the physical properties of the freshly spun textile material, or the ageing characteristics thereof.

Examples of oxidizing agents that may be employed in carrying out the invention include nitric acid, peracetic acid, benzoyl peroxide, sulfuric acid, and acetyl peroxide. The best results, however, are obtained when hydrogen peroxide is employed as the oxidizing agent. The use of hydrogen peroxide for this purpose involves no special handling problems. It is extremely effective in obtaining the desired results. Moreover, when hydrogen peroxide is used, there are no by-products formed which will tend to remain in the textile materials and any excess hydrogen peroxide will be readily removed from the said materials during the spinning operation. As a result, there is no need to wash or otherwise treat the textile materials to remove by-products of the oxidation reaction, or any excess oxidizing agent, the continued presence of which in the textile materials would be undesirable and tend to weaken or otherwise degrade the said materials.

The percentage by weight of oxidizing agent (100% concentration), based on the weight of the polymer in the textile material, should be between about 0.5 and 3.0. The oxidizing agents are conveniently employed in the form of their aqueous solutions which, in the case of the hydrogen peroxide, may have a concentration of between about 30 and 98% by weight. The treatment with the oxidizing agent may be applied directly to the polymer by contacting the said polymer with the oxidizing agent. It is preferred, however, to introduce the oxidizing agent into the spinning solution that contains the filament-forming substance from which the textile material is prepared together with the polymer, all dissolved in a suitable solvent. By carrying out the treatment with the oxidizing agent in this manner, there is obtained a greater uniformity than is normally possible in the case of treating the polymer itself, especially where the proportion of oxidizing agent is small. The spinning solution may be treated with the oxidizing agent on a batch basis, or in a continuous manner, as desired. In some cases, the polymer is introduced continuously into a stream comprising a solution of the filament-forming substance as the said solution flows to a spinning means. In such cases, the desired proportion of oxidizing agent may be mixed with the said polymer and the mixture introduced into the stream of spinning solution. The duration of treatment with the oxidizing agent is not critical and may range from as little as about 1 hour to as much as about 24 hours, or even more where the oxidizing agent is mixed into a mass of spinning solution. On the other hand, where the oxidizing agent is injected continuously into a stream of spinning solution, the duration of treatment may be as low as 5 minutes, or less. The temperature of the treatment is likewise not critical, so that the treatment may be carried out at any suitable stage in the process of manufacturing the polymer or the textile material at the temperature normally employed for such stage. Following the treatment with the oxidizing agent the filament-forming substance containing the polymer is converted into a textile material by conventional spinning techniques, such as dry-spinning, or the like.

The textile materials to which the process of this invention is applicable include those having a basis of the organic derivatives of cellulose such as, for example, cellulose acetate, cellulose propionate, cellulose butyrate, cellulose acetate formate, cellulose acetate propionate, cellulose acetate butyrate, cellulose benzoate and ethyl cellulose; as well as the polyesters such as for example, polyethylene terephthalate. While the process of this invention is specially useful in the manufacture of yarns, filaments and the like, it may also find application in the manufacture of films and the like from the said substances where it is desired to incorporate the polymer therein.

The following example is given to illustrate this invention further.

*Example*

There is continuously injected into a stream of spinning solution comprising cellulose acetate dissolved in acetone, and containing a portion of cellulose acetate that has previously been spun and lubricated and is being reprocessed, a mixture of 5% by weight, based on the weight of the cellulose acetate, of a copolymer of equimolar quantities of maleic anhydride and methyl vinyl ether, and 1.5% by weight, based on the weight of copolymer, of hydrogen peroxide, in the form of a 30% by weight aqueous solution, all dissolved in acetone to form a solution containing 40% by weight of the polymer. The spinning solution is then forced through a spinneret into a cabinet through which a current of heated air flows and wherein the acetone is removed from the freshly formed yarn. Any excess hydrogen peroxide is also removed from the freshly formed yarn, probably through decomposition at the spinning temperature. The yarn is then lubricated and taken up in package form, following which it is converted into a fabric. On heating the fabric for 15 minutes at 160° C., or for one hour at 70° C., no undesirable coloration forms. A yarn manufactured in the same manner and from the same starting materials, except that the hydrogen peroxide is omitted, has an undesirable pinkish coloration. The tenacity and elongation of the hydrogen peroxide treated yarn are substantially identical to those of the yarn that has not been so treated. In addition, the whiteness of the hydrogen peroxide treated yarn is somewhat better than that of yarn prepared from the same cellulose acetate which has had no polymer or hydrogen peroxide added thereto. The ageing characteristics of the two yarns are the same.

The fabric formed from the hydrogen peroxide treated yarn is dyed with an aqueous dyebath having a pH of 8 and containing 0.3% by weight on the weight of the fabric of Interchemical Blue B (Pr 228) (35.4% color), 2 ml./liter of Turkey Red Oil, 0.5 gram/liter of soap and 0.5 gram/liter of sodium carbonate, washed and dried. The dyed fabric, when exposed to 1 unit of gas fading, as described in A.A.T.C.C. test procedure 23–52 shows only a slight change is shade, with 2 units of gas-fading exposure, the fabric shows only a slight to moderate change in shade, and with 3 units of gas-fading exposure the fabric shows only a slight to moderate change in shade. A control fabric containing no polymer shows a severe change in color with only 1 unit of gas-fading exposure.

While the claims specify that there is incorporated into the textile material an alkaline salt of a polymer containing free carboxyl groups, it should be understood, as pointed out above, that the polymer which is first added to the textile material contains carboxyl groups, anhydride groups or a mixture of the two. On subsequent processing, the said polymer is converted into the alkaline salt specified.

It is to be understood that the foregoing detailed description is given merely by way of illustration and that many variations may be made therein without departing from the spirit of my invention.

Having described my invention what I desire to secure by Letters Patent is:

1. The process which comprises contacting in liquid state a filament-forming material selected from the group consisting of cellulose esters and polyethylene terephthalate, said filament-forming material being one which when dyed with a blue anthraquinone dyestuff undergoes gas fading on exposure to acid fumes, an acyloxy-containing polymer of a monomer selected from the group consisting of ethylenically unsaturated mono- and di-carboxylic aliphatic acids and anhydrides thereof, and hydrogen peroxide present in about 0.5 to 3% based on the weight of said polymer, spinning said filament-forming material into filaments, and contacting said filaments with alkali to form salts of the acyloxy groups of the acyloxy-containing polymer, said filaments being free of undesired coloration and resisting gas-fading even when dyed with dyes normally subject to gas-fading said polymer being present in amount sufficient to improve the resistance of said filamentary material to said gas-fading.

2. In a process in which filaments are formed from a blend of (A) a filament-forming material of cellulose acetate said filament-forming material being one which when dyed with a blue anthraquinone dyestuff undergoes gas-fading on exposure to acid fumes and (B) an acyloxy-containing polymer of a monomer selected from the group consisting of ethylenically unsaturated mono- and di-carboxylic aliphatic acids and anhydrides thereof, said acyloxy-containing polymer acting, when converted to an alkaline salt thereof, to improve the resistance to gas-fading of said filamentary material and being present in said blend in an amount sufficient to so improve said resistance to gas-fading, and the filaments formed from said blend showing a tendency to develop undesired coloration, the improvement which comprises overcoming said tendency by bringing said polymer into admixture with from about 0.5 to 3% by the weight based on the weight of said acyloxy-containing polymer of a peroxygen compound.

3. Process as set forth in claim 2 in which said oxidizing agent is hydrogen peroxide.

4. Process as set forth in claim 3 in which the amount of said acyloxy-containing polymer is 5% by weight based on the weight of the cellulose acetate.

5. In a process in which filaments are formed from a blend of (A) a filament-forming material of cellulose acetate, said filament-forming material being one which when dyed with a blue anthraquinone dyestuff undergoes gas-fading on exposure to acid fumes, and (B) and acyloxy-containing polymer of an alpha, beta, ethylenically unsaturated di-carboxylic acid and an alkyl vinyl ether, said acyloxy-containing polymer acting, when converted to an alkaline salt thereof, to improve the resistance to gas-fading of said filamentary material and being present in said blend in an amount sufficient to so improve said resistance to gas-fading, and the filaments formed from said blend showing a tendency to develop undesired coloration, the improvement which comprises overcoming said tendency by bringing said polymer into admixture with about 0.5 to 3% by weight based on the weight of said acyloxy-containing polymer of hydrogen peroxide.

References Cited in the file of this patent
UNITED STATES PATENTS

| | | |
|---|---|---|
| 2,586,477 | Niles | Feb. 19, 1952 |
| 2,748,091 | Allewelt | May 29, 1956 |